United States Patent
Ifju et al.

(10) Patent No.: US 7,331,546 B2
(45) Date of Patent: Feb. 19, 2008

(54) BENDABLE WING FOR MICRO AIR VEHICLE

(75) Inventors: Peter Ifju, Newberry, FL (US); Kyu-Ho Lee, Gainesville, FL (US); Roberto Albertani, Gainesville, FL (US); Shawn J. Mitryk, Lake Mary, FL (US); Frank J. Boria, Alachua, FL (US); Mujahid Abdulrahim, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 11/510,013

(22) Filed: Aug. 25, 2006

(65) Prior Publication Data

US 2006/0284005 A1 Dec. 21, 2006

Related U.S. Application Data

(62) Division of application No. 10/731,777, filed on Dec. 9, 2003.

(60) Provisional application No. 60/431,920, filed on Dec. 9, 2002.

(51) Int. Cl.
*B64C 3/56* (2006.01)
(52) U.S. Cl. .............. 244/123.1; 244/123.14
(58) Field of Classification Search ........... 446/62; 244/123.1, 123.7, 123.8, 123.9, 123.12, 123.14, 244/22, 72
See application file for complete search history.

(56) References Cited

U.S. PATENT DOCUMENTS

| | | | |
|---|---|---|---|
| 2,783,955 A | 3/1957 | Fitzpatrick | |
| 3,744,741 A | 7/1973 | Christain et al. | |
| 4,332,103 A | 6/1982 | Schulman | |
| 4,485,991 A | 12/1984 | Fuller | |
| 5,078,339 A | 1/1992 | Lapidot | |
| 6,082,671 A | 7/2000 | Michelson | |
| 6,626,397 B2 | 9/2003 | Yifrach | |
| 2004/0245393 A1* | 12/2004 | Ifju et al. | 244/123 |

OTHER PUBLICATIONS

Cadogan et al., "Inflatable and Rigidizable Wing Components for Unmanned Aerial Vehicles," American Institute of Aeronautics and Astronautics, Apr. 1-8, 2003.

(Continued)

*Primary Examiner*—Timothy D. Collins
(74) *Attorney, Agent, or Firm*—Akerman Senterfitt; Gregory A. Nelson; Michael K. Dixon

(57) ABSTRACT

A micro air vehicle having a bendable wing enabling the micro air vehicle to fly. The bendable wing may be bent downwards so that the wingspan may be reduced for storing the micro air vehicle. The bendable wing may be formed from one or more layers of material, and the wing may have a camber such that a concave surface of the wing faces downward. The wing may substantially resist flexing upwards and may transfer uplift forces to a central body of the micro air vehicle. In addition, the wing may be bent severely downwards by applying a force to tips of the wing. The micro air vehicle is capable of being stored in a small cylindrical tube and may be deployed from the tube by simply releasing the micro air vehicle from the tube.

24 Claims, 5 Drawing Sheets

OTHER PUBLICATIONS

Albertani et al., "Experimental analysis of deformation for flexible-wing Micro Air Vehicles," AIAA SDM Conference, Paper, Austin, TX, 2005.

Albertani et al., "Aerodynamic Characterization and Deformation Measurements of a Flexible Wing Micro Air Vehicle," SEM Annual Conference, Portland, OR, 2005.

Garcia et al., "Roll Control for a Micro Air Vehicle Using Active Wing Morphing," AIAA Guidance, Navigation and Control Conference, Austin, TX, AIAA-2003-5347, Aug. 2003.

Lian et al., "Mebrane Wing Model for Micro Air Vehicles," AIAA Journal, vol. 41, No. 12, Dec. 2003.

Abdulrahim et al., "Flight Characterisitics of Wing Shaping for a Micro Air Vehicle with Membrane Wings," International Forum on Aeroelasticity and Structural Dynamics, Amsterdam, The Netherlands, IFASD-US-24, Jun. 2003.

Ifju et al., "Flexible-Wing-Based Micro Air Vehicles," AIAA Aerospace Sciences Meeting and Exhibit, 40th Reno, NV, Jan. 14-17, 2002.

Waszak et al., "Stability and Control Properties of an Aeroelastic Fixed Wing Micro Aerial Vehicle," AIAA Atmospheric Flight Mechanics Conf., Montreal, Canada, Aug. 2001.

Ifju et al., "Composite Materials for Micro Air Vehicles," SAMPE Conference, Long Beach, CA, May 2001.

* cited by examiner

BENDABLE WING FOR MICRO AIR VEHICLE

CROSS-REFERENCE TO RELATED APPLICATION

This application is a divisional of U.S. patent application Ser. No. 10/731,777, filed Dec. 9, 2003 now abandoned, which claims the benefit of U.S. Provisional Application No. 60/431,920, filed Dec. 9, 2002.

FIELD OF THE INVENTION

This invention is directed generally to micro air vehicles, and more particularly, to wing configurations for micro air vehicles.

BACKGROUND

Micro air vehicles can trace their beginnings to model airplanes, which typically resemble full size airplanes. Micro air vehicles generally encompass all relatively small unmanned flying objects, such as those having wingspans less than about 36 inches. Micro air vehicles are often powered by small gasoline or electric propeller driven engines. Micro air vehicles are relatively lightweight vehicles capable of being used for a variety of purposes, such as for recreation, reconnaissance, and other purposes. Because of their small size, micro air vehicles lend themselves to a variety of uses.

Many micro air vehicles have fixed, rigid wings that are incapable of having their wing span reduced for storage. Micro air vehicles having fixed wings are often difficult to store and do not lend themselves for storage in a knapsack or other item typically carried by military personnel in reconnaissance missions. Some micro air vehicles have collapsible wings that pivot about one or more pivot points. Typically, these micro air vehicles require a series of assembly steps to transform the micro air vehicle from a deployable condition to a storage condition, and vice versa.

Because of their small size and ability to go relatively unnoticed, micro air vehicles have been outfitted with cameras, both still frame cameras and video cameras, and used in hostile areas for reconnaissance purposes. However, many of the micro air vehicles are inconvenient to be carried by military personnel because of their cumbersome wing span and shape. Thus, a need exists for a micro air vehicle having wings capable of having their wingspan reduced. In addition, other micro air vehicles having wings with reduceable wingspans require a plurality of assembly steps to transform the wings of the micro air vehicle from a deployable condition to a storage condition, and vice versa. Such requirements prevent these micro air vehicles from being deployed quickly and without human interaction. If micro air vehicles were able to be transformed between a storage condition and a deployable condition without assembly steps, the micro air vehicles could be used in a greater variety of applications. Thus, a need exists for a micro air vehicle capable of being transformed between a storage condition and a deployable condition without assembly steps.

SUMMARY OF THE INVENTION

This invention is directed to a micro air vehicle having a bendable wing enabling the micro air vehicle to be stored in containers substantially smaller than the micro air vehicle and enabling the bendable wing to go from a storage condition to a deployable condition without assembly or user interaction. Rather, the forces used to hold the wing tips of the wing need only be abated.

The micro air vehicle may be formed from a central body and one or more wings. The wing may be formed from one or more layers of a resilient material having a camber forming a concave surface facing downward. The wing may be bendable from a steady state position in a first direction such that tips of the wing may be bent toward the concave surface but not in a second direction that is generally opposite to the first direction. In other words, the wing may bent downwards but not upwards. The wing may also be capable of returning to the steady state position upon release the tips of the wing.

The wing may have a camber such that a bottom surface of the wing has a generally concave configuration when viewed parallel to a longitudinal axis of the wing. The camber may contribute to the stability of flight of a micro air vehicle to which the wing is attached and allow the wing to be bent downwards by not upwards. Thus, the wing may absorb and transfer uplift forces to the central body and allow the wing to be bent downward for storage.

In an alternative embodiment, the wing may be formed from a support structure covered by a layer of material. The support structure may be formed from one or more ribs, which may be, but are not required to be, generally parallel to each other. The layer of material covering the support structure may be, but is not limited to being, latex or other appropriate materials.

The bendable wing enables the wing to be stored is containers smaller than the micro air vehicle to which the wing is attached. For instance, the bendable wing having a wing span of about ten inches may be bent around the central body of a micro air vehicle so that the wing may be stored in a container having a diameter of about three inches. Such a characteristic enables a micro air vehicle to which the bendable wing is attached to be used for reconnaissance missions, for deployment from missiles just prior to impact for bomb damage assessment, and carried by special forces operatives in the field on their person.

An advantage of this invention is that a micro air vehicle incorporating the bendable wing of this invention may be stored in a small container and deployed without any actions taken to assemble the wings other than to release the tips from restraint. Releasing the wings enables the wings to return to the steady state position.

Another advantage of this invention is that the bendable wing has sufficient stiffness to absorb and transfer uplift forces to the body while enabling the wings to be bent downwardly for storage.

Yet another advantage of this invention is that by being able to be stored in such a small container, a micro air vehicle may be conveniently carried on a person, such as military personnel, without consuming much room.

Still another advantage of this invention is that the bendable wing may be produced relatively inexpensively.

Another advantage of this invention is that the wing is durable and capable of withstanding crash landings.

These and other advantages will become obvious upon review of the detailed written description below of these and other embodiments.

BRIEF DESCRIPTION OF THE DRAWINGS

The accompanying drawings, which are incorporated in and form a part of the specification, illustrate preferred embodiments of the presently disclosed invention(s) and, together with the description, disclose the principles of the invention(s). These several illustrative figures include the following.

DETAILED DESCRIPTION OF THE INVENTION

Figure 1:
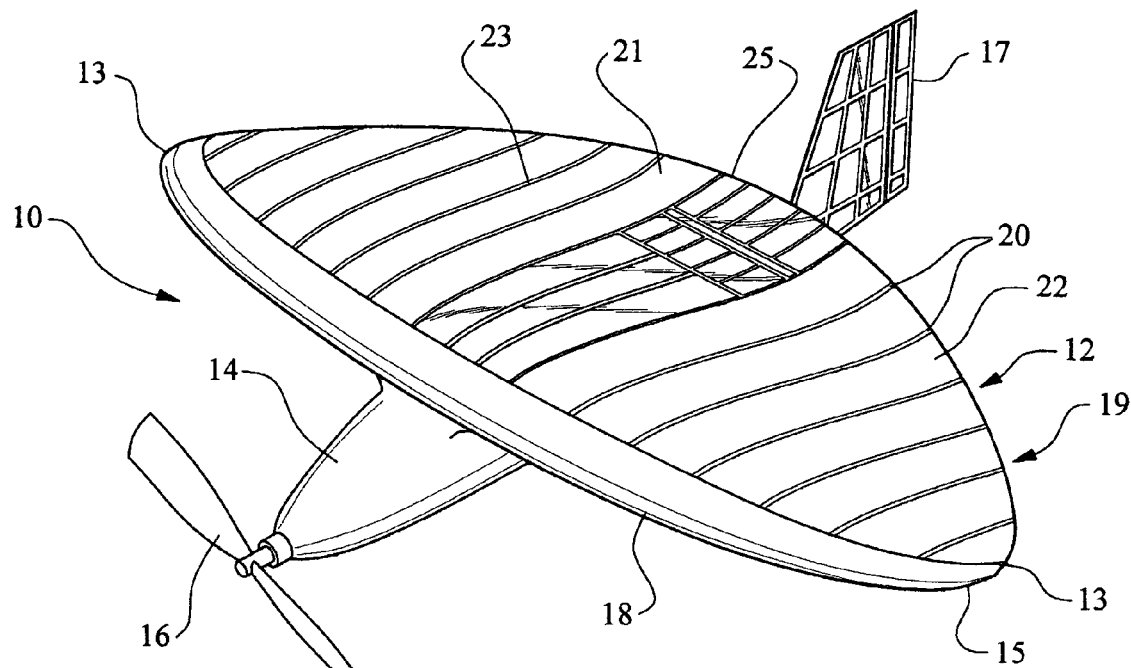
FIG. 1 is a perspective view of a top side of an embodiment of this invention.
Figure 2:
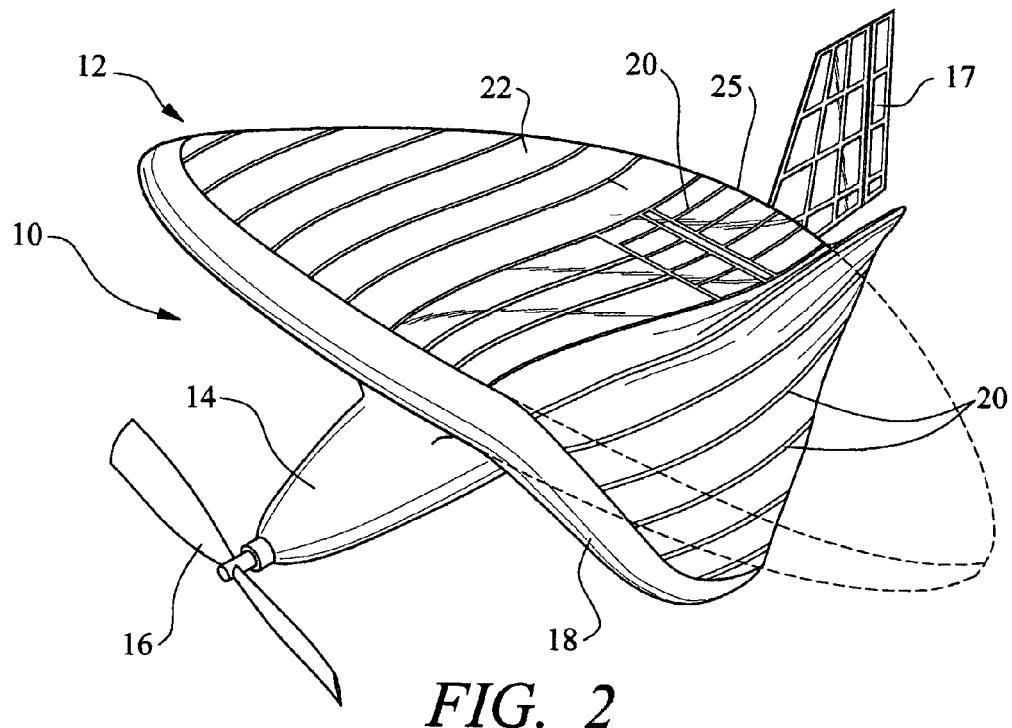
FIG. 2 is a perspective view of the embodiment shown in FIG. 1 with a portion of the bendable wing being bent around a central body of a micro air vehicle as a result of a downward force applied to a tip of the wing.
Figure 3:
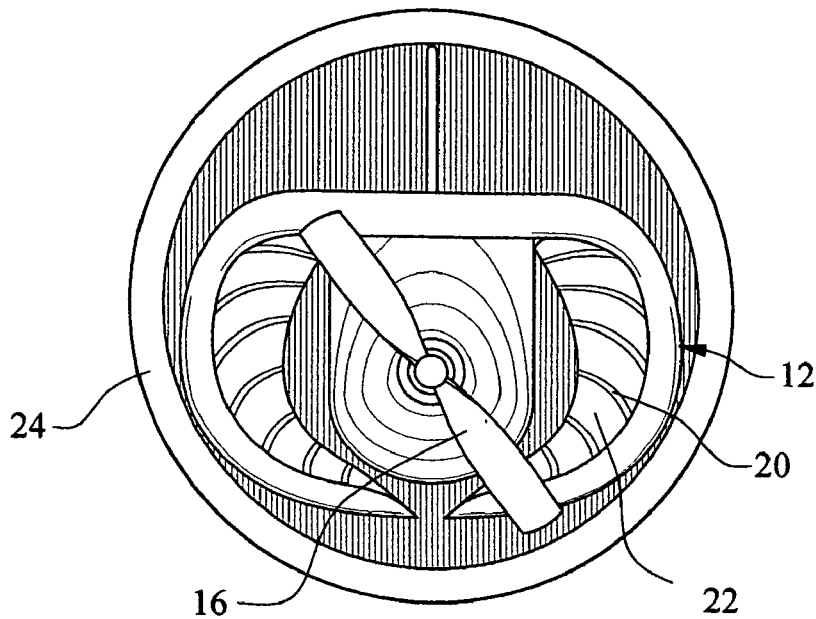
FIG. 3 is a front view of a micro air vehicle inserted into a small diameter tube with both sides of the bendable wing bent around the central body of the micro air vehicle.
Figure 4:
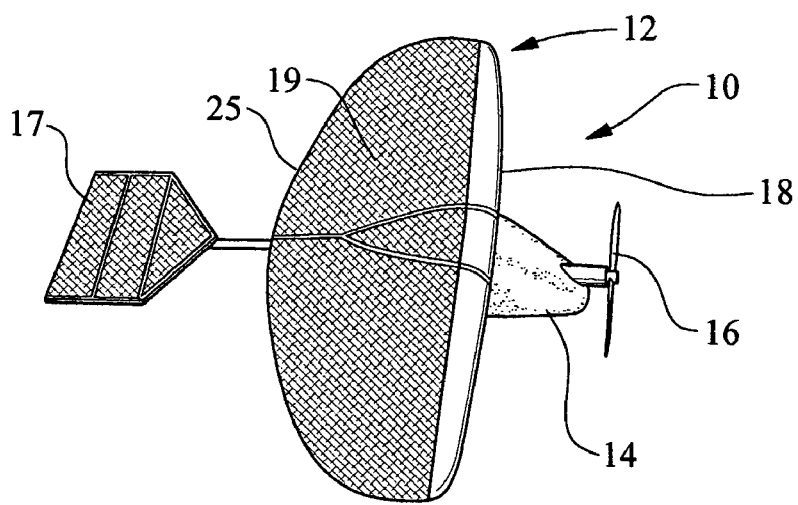
FIG. 4 is a perspective view of an alternative embodiment of the bendable wing of the micro air vehicle.
Figure 5:
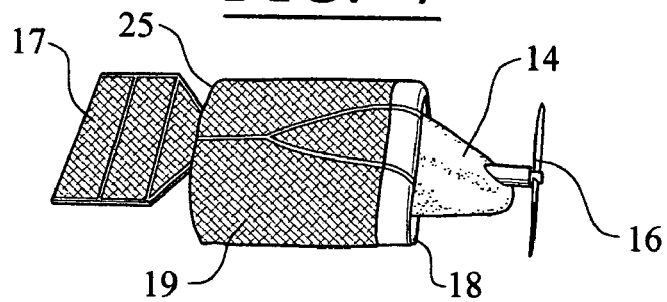
FIG. 5 is a perspective view of the alternative embodiment of the bendable wing shown in FIG. 4 in flexed storage condition with the tips of the wing bent around the central body of the micro air vehicle.
Figure 6:
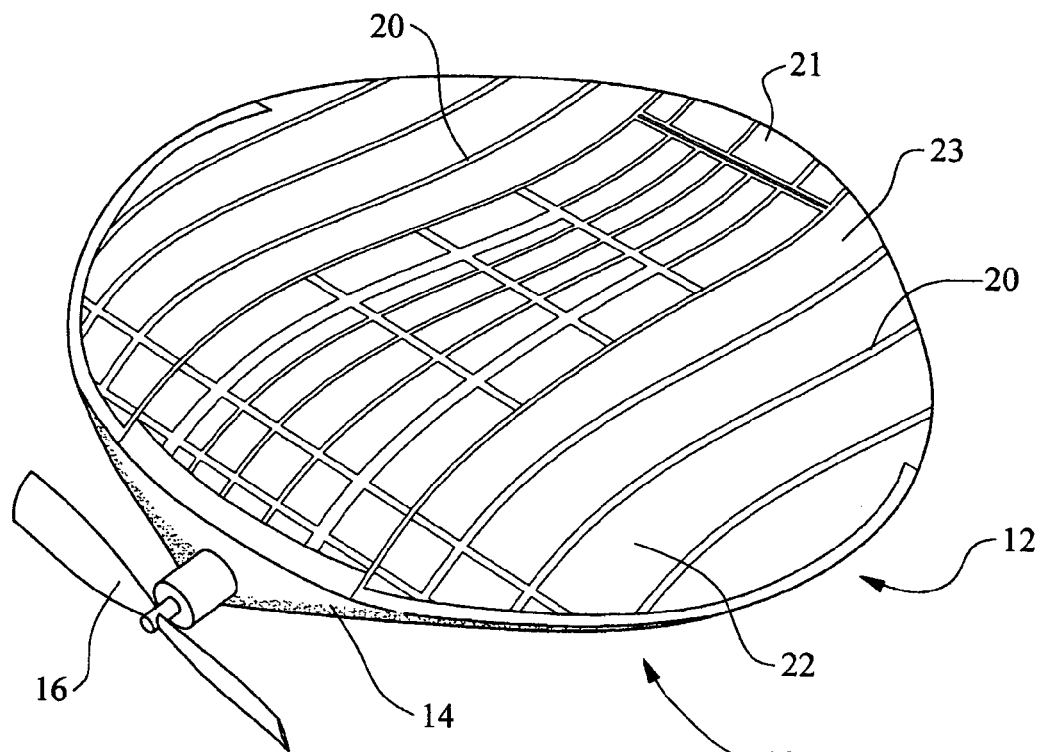
FIG. 6 is a perspective view of yet another alternative configuration of the bendable wing of this invention.

This invention is directed to a wing 12 for a micro air vehicle 10, as shown in FIGS. 1-10, that is bendable to enable the wing 12 to be easily stored in, for instance, a tube or other structure. The wing 12 may be attached to a body 14 that may or may not house an engine capable of providing rotational motion to a propeller 16. The engine may be, but is not limited to, one of many conventional engines used to power miniature aircraft. Body 14 may include a tail 17 for controlling the micro air vehicle 10. The tail 17 may be positioned generally orthogonal to the wing 12, as shown in FIGS. 1, 2, 8, and 10, generally parallel to the wing 12, as shown in FIGS. 4 and 5, or in another position. Micro air vehicle 10 may include other components that are typically found on miniature aircraft.

As shown in FIGS. 4 and 5, wing 12 may be formed one or more layers formed from resilient materials such that the wing 12 is bendable from a steady state position. The wing 12 may be bent in a first direction, as shown in FIG. 5, such that tips 13 of the wing 12 may be bent downwardly toward a concave surface 15 but not substantially in a second direction that is generally opposite to the first direction. The resilient materials have a high degree of elasticity and are therefore capable of returning the wing 12 to the steady state position upon release of the tips 13 of the wing 12. In at least one embodiment, the camber of the wing 12 is configured such that a bottom surface of the wing 12 forms a concave surface.

Wing 12, as shown in FIGS. 1, 4, 6, and 8, may be formed from a leading edge portion 18, a rear portion 19, and a trailing edge 25. Leading edge portion 18, rear portion 19, and trailing edge 25 may together form a monolithic structure formed from the same material, or may be different structures formed from the same or different materials and coupled together. In at least one embodiment, the wing 12, as shown in FIG. 4, may be formed from a single layer of material, and, in alternative embodiments, may be formed from two or more layers of material. The wing 12 may be formed from resilient materials, such as, but not limited to: fiber reinforced laminates and fabrics, such as, carbon fiber reinforced polymers, glass reinforced polymers, and aramid reinforced polymers; sheet metal, such as, spring steel, high strength aluminum, stainless steel, and titanium; foam materials; and plastics. In at least one embodiment, leading edge portion 18 may be formed from pre-impregnated carbon/epoxy fiber cloth, which provides sufficient strength to absorb forces encountered from wind gusts while maintaining a sufficiently light weight. In at least another embodiment, the leading edge 18 may be formed from an aramid fiber/epoxy mixture and at least a portion of the remainder of the rear portion 19 may be formed from a single layer of carbon fiber/epoxy weave.

Wing 12 is bendable so that the overall size of micro air vehicle 10 may be reduced for storage. Wing 12 may be bent by applying a downward force to the tips 13 of wing 12, as shown in FIGS. 2 and 5. While wing 21 may be bent downwards, wing 12 resists being bent upwardly as a result of the camber of leading edge portion 18 or the wing 12, or both. More specifically, the leading edge portion 18 is stiff when loaded with upwardly directed loads, such as aerodynamic loads. The camber provides wing 12 with the structural stability to substantially prevent wing 12 from bending upwardly when subjected to an upwardly directed load. Thus, wing 12 can be bent with a downwardly applied force but not with an upwardly applied force because of the configuration of the wing 12 and materials used to form the wing 12. The wing 12 may be bent so that a substantial portion of the wing 12 may be wrapped around to an opposite side of the body 14 from the steady state position shown in FIGS. 1 and 5.

In other embodiments, as shown in FIGS. 1, 2, and 6-10, rear portion 19 may be formed from ribs 20 and a skin 22. Ribs 20 may be formed from unidirectional fibers, such as, but not limited to, carbon fiber strands, and skin 22 may be formed from a lightweight, thin material, such as, but not limited to, latex and other appropriate materials. Ribs 20 may include members positioned generally parallel to body 14.

Figure 10:
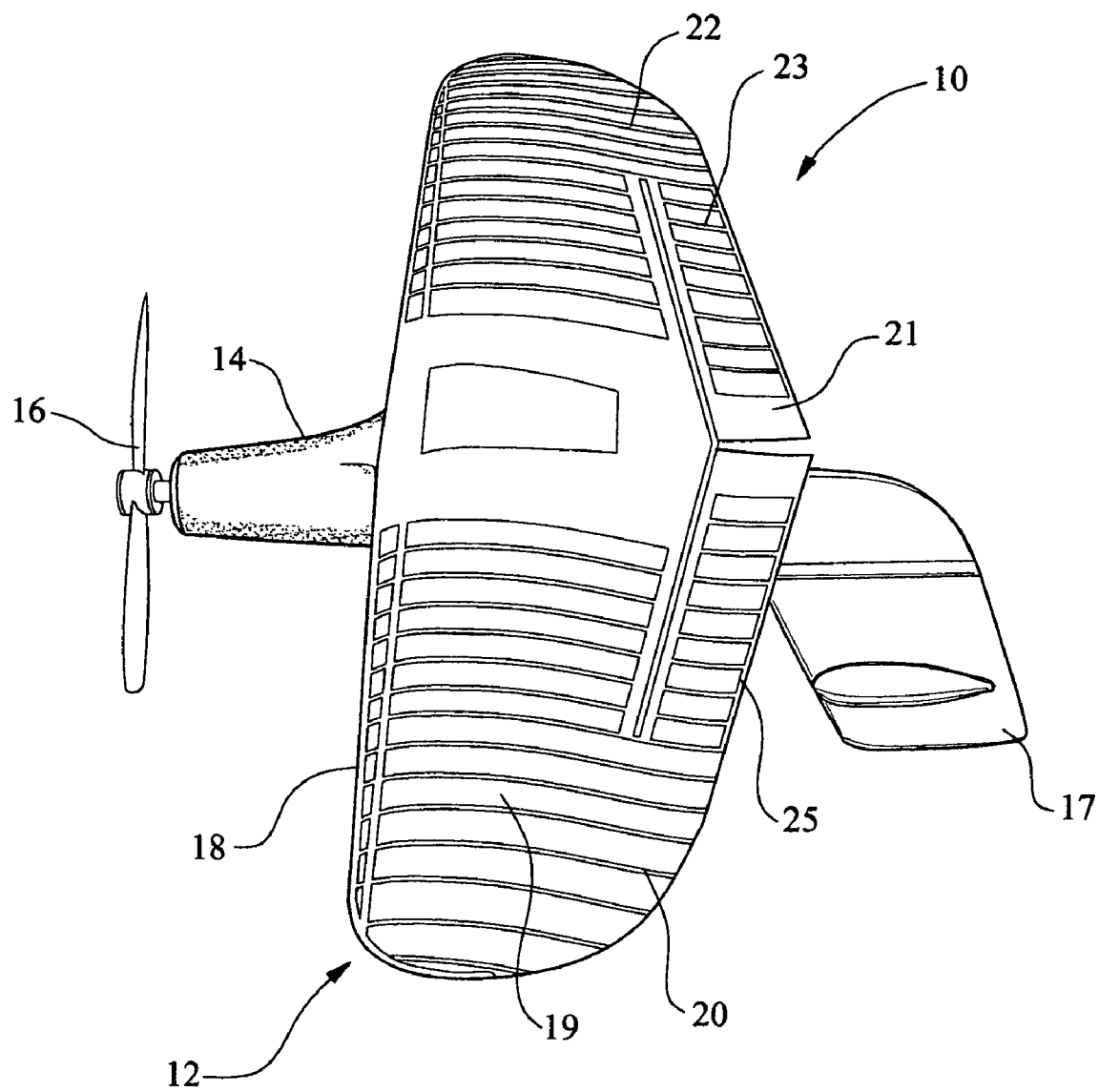
FIG. 10 is a perspective view of a top side of the embodiment shown in FIG. 9.

Rear portion 19 may or may not be concave when viewed from below, as shown in FIG. 10. If rear portion 19 is concave, the concave shape of rear portion 19 may or may not be equal to the concave shape of leading edge portion 18. If the rear portion 19 is not concave, the leading edge portion 18 has a camber forming a concave face on the bottom surface 15 of the wing 12. The shape of rear portion 19 may be any shape capable of providing aerodynamic lift when coupled to leading edge portion 18. Rear portion 19 may include a riser 21 at the rear portion of wing 12. The riser 21 may form a concave portion on an upper surface 23 of the wing 12 in the rear portion 19. The riser 21 may extend completely across the trailing edge 25 or may extend across only a portion of the trailing edge 25.

In one embodiment, leading edge 18 has a greater thickness than the thickness of the rear portion 19, wherein the characteristic that wing 12 may be bent downwards but not upwards is attributable to the configuration of leading edge portion 18. In other embodiments, leading edge portion 18 and rear portion 19 may or may not have the same thickness, depending on the strength of the materials used to form leading edge portion 18 and rear portion 19.

Figure 7:
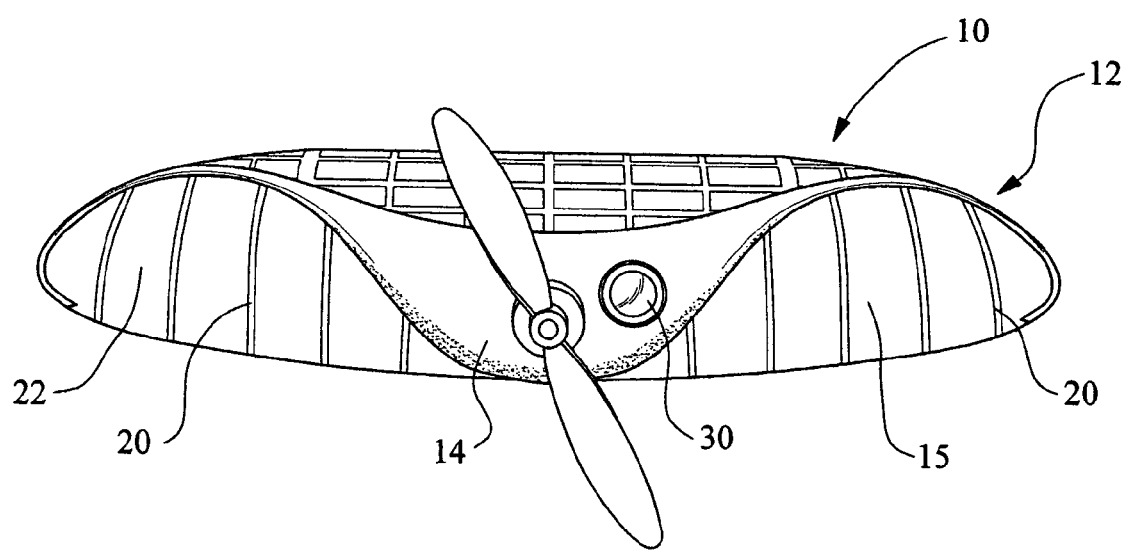
FIG. 7 is a front view of the embodiment shown in FIG. 6.
Figure 8:
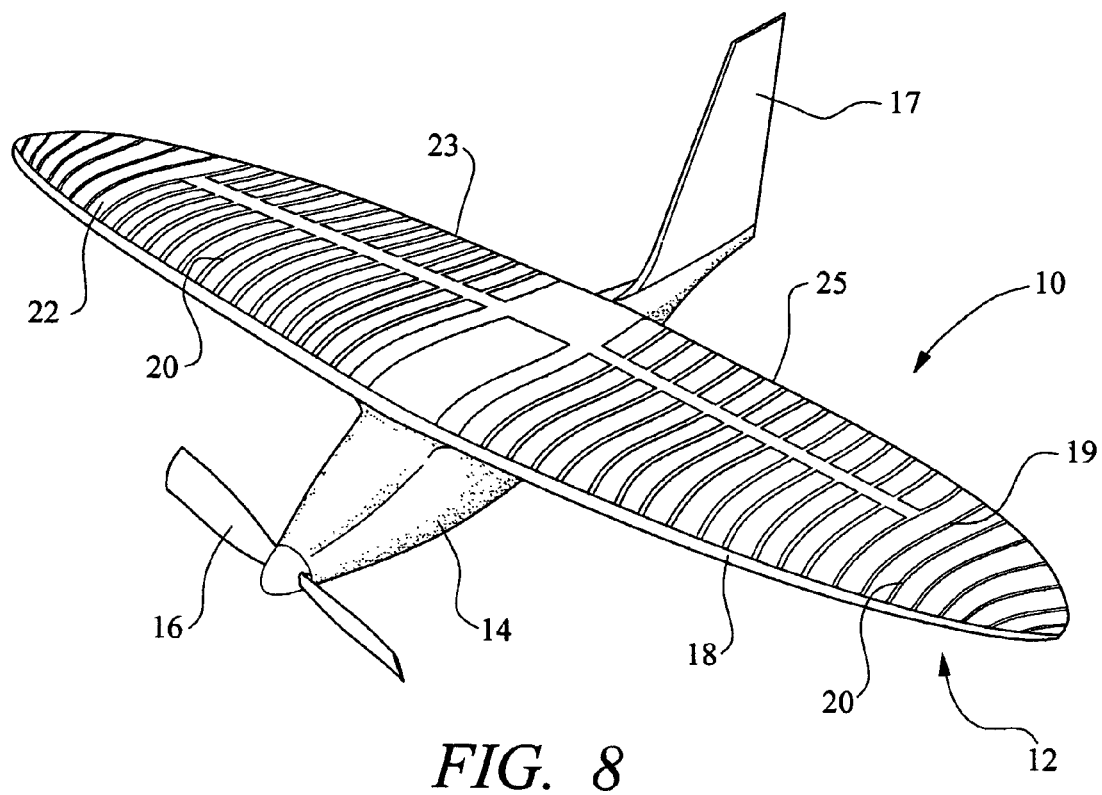
FIG. 8 is a perspective view of still another embodiment of this invention.
Figure 9:
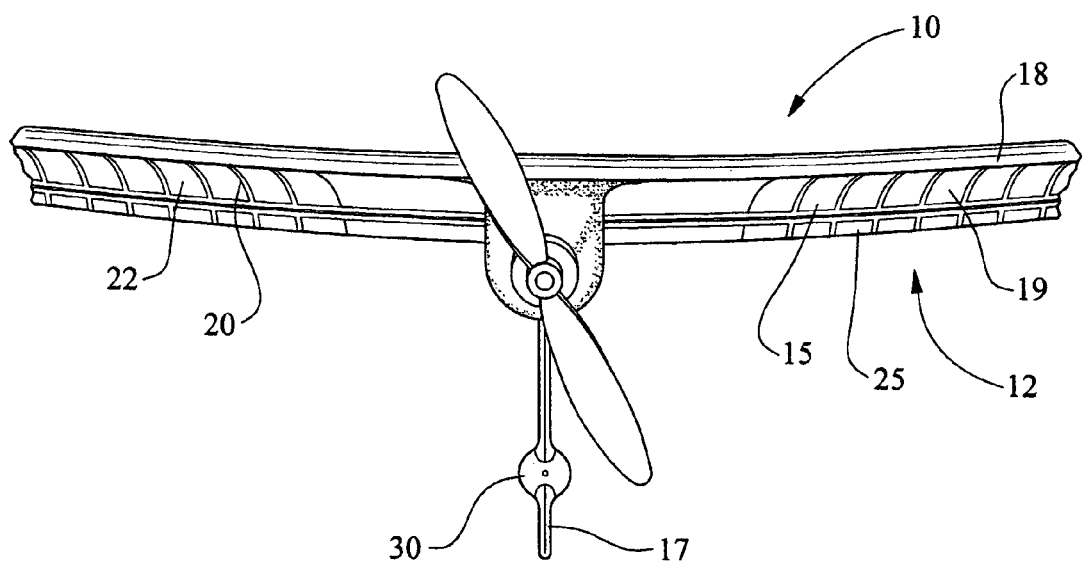
FIG. 9 is a front view of another embodiment of this invention.

Wing 12 may have a wing span between about six inches and about twenty four inches. In one embodiment, wing 12 may have a ten inch wing span enabling it to be stored in a cylinder 24, as shown in FIG. 3, having a diameter less than three inches. Having the capability of being stored in such small cylinders enables micro air vehicle 10 to be used for reconnaissance missions, for deployment from missiles just prior to impact for bomb damage assessment, and carried by special forces operatives in the field on their person. Micro-air vehicle 10 may be used in other applications as well. In other embodiments, wing 12 may vary in length between about three inches and about 24 inches. As shown in FIGS. 7 and 9, the micro air vehicle 10 may include a camera 30, which may be, but is not limited to being, a video camera, a still photography camera, or other audio or visual recording devices.

The configuration of wing 12 shown in FIGS. 1-10 and the elastic materials from which the wing 12 is formed enables wing 12 to return to its original, steady state shape, as shown in FIG. 1, 4, and 6-10, after being removed from storage without additional steps or use of mechanical mechanisms, such as servos, motors, piezoelectrics, or shape memory alloys. Instead, wing 12 returns to its original shape because of the elastic characteristics of the wing 12 causes the wing 12 to remain under forces when bent from its original position. These forces abate only when wing 12 is returned to its original position. The materials used to form the wing 12 have great flexibility and elasticity and bend rather than permanently yielding. Thus, micro air vehicle 10 needs only to be removed from a storage container 24, as shown in FIG. 3, for wing 12 to return to its original shape.

The wing 12 is configured such that the wing 12 may be bent severely about the body 14 of the micro air vehicle 10. In fact, the wing 12 may be bent so severely that the wing tips 13 and wing 12 are rolled up around the body 14, as shown in FIG. 5. This configuration is very advantageous. However, the wing 12 also prevents substantial bending in the opposite direction. This is not to say that the wing will not flex during use. Rather, the wing 12 will flex, or bow, in the opposite direction under normal stresses associated with flight. However, the wing 12 will not bend substantially in the opposite direction.

The configuration of wing 12 possess numerous aerodynamic advantages including: reduced drag due to the curvature of leading edge portion 18; and improved wind gust rejection due to adaptive washout as a result of wing 12 flexing, twisting and decambering. This configuration of wing 12 allows micro air vehicle 12 to fly more smoothly than conventional rigid wing designs in smooth and gusty wind conditions. Wing 12 is also more durable than rigid wings because the configuration of wing 12 bends upon impact with the ground or other structure, rather than breaking.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A wing for a micro air vehicle, comprising:
   a leading edge formed from a first material capable of bending in a first direction but not bending substantially in a second, generally opposite direction;
   at least one layer of a resilient, flexible material that is different from the material forming the leading edge, extending from the leading edge to a trailing edge, and having a camber forming a concave surface facing downward; and
   a plurality of ribs extending from the leading edge in the direction of the trailing edge;
   wherein the wing is bendable from a steady state position in a first direction such that tips of the wing may be bent toward the concave surface but not substantially in a second direction that is generally opposite to the first direction; and
   wherein the wing is capable of returning to the steady state position by releasing the tips of the wing.

2. The wing for a micro air vehicle of claim 1, wherein the leading edge is formed from an aramid fiber/epoxy mixture and at least a portion of the remainder of the at least one layer is formed from a mixture of carbon fiber and epoxy.

3. The wing for a micro air vehicle of claim 1, wherein the leading edge is formed from pre-impregnated carbon/epoxy fiber cloth.

4. The wing for a micro air vehicle of claim 1, wherein the leading edge is formed from an aramid fiber/epoxy mixture.

5. The wing for a micro air vehicle of claim 1, wherein the at least one layer of a resilient material is formed from materials selected from the group consisting of fiber reinforced laminates, foam materials, and plastics.

6. The wing for a micro air vehicle of claim 1, wherein a wing span of the wing is between about three inches and about twenty four inches.

7. The wing for a micro air vehicle of claim 1, wherein the wing is capable of being bent around a central body of a micro air vehicle so that the micro air vehicle including the wing may fit within a tube having a diameter of about three inches.

8. The wing for a micro air vehicle of claim 1, further comprising a riser section forming a concave portion on an upper surface of the wing proximate to a trailing edge of the wing.

9. The wing for a micro air vehicle of claim 1, wherein the material forming a remainder of the at least one layer is formed from latex.

10. The wing for a micro air vehicle of claim 1, wherein the ribs are generally parallel to each other.

11. The wing for a micro air vehicle of claim 1, wherein the ribs are formed of carbon fiber.

12. A micro air vehicle, comprising:
   a central body;
   a wing attached to the central body, wherein the wing comprises:
     a leading edge formed from a first material capable of bending in a first direction but not bending substantially in a second, generally opposite direction;
     at least one layer of a resilient, flexible material that is different from the material forming the leading edge, extending from the leading edge to a trailing edge, and having a camber forming a concave surface facing downward; and
     a plurality of ribs extending from the leading edge in the direction of the trailing edge;
     wherein the wing is bendable from a steady state position in a first direction such that tips of the wing may be bent toward the concave surface but not substantially in a second direction that is generally opposite to the first direction; and
     wherein the wing is capable of returning to the steady state position by releasing the tips of the wing.

13. The micro air vehicle of claim 12, wherein the leading edge is formed from an aramid fiber/epoxy mixture and at least a portion of the remainder of the at least one layer is formed from a mixture of carbon fiber and epoxy.

14. The micro air vehicle of claim 12, wherein the leading edge is formed from pre-impregnated carbon/epoxy fiber cloth.

15. The micro air vehicle of claim 12, wherein the leading edge is formed from an aramid fiber/epoxy mixture.

16. The micro air vehicle of claim 12, wherein the at least one layer of a resilient material is formed from materials selected from the group consisting of fiber reinforced laminates, foam materials, and plastics.

17. The micro air vehicle of claim 12, wherein a wing span of the wing is between about three inches and about twenty four inches.

18. The micro air vehicle of claim 12, wherein the wing is capable of being bent around a central body of a micro air vehicle so that the micro air vehicle including the wing may fit within a tube having a diameter of about three inches.

19. The micro air vehicle of claim 12, further comprising a riser section forming a concave portion on an upper surface of the wing proximate to a trailing edge of the wing.

20. The micro air vehicle of claim 12, further comprising a tail coupled to the central body that is generally orthogonal to the wing.

21. The micro air vehicle of claim 12, further comprising a tail coupled to the central body that is generally vertical to the wing.

22. The micro air vehicle of claim 12, wherein the material forming a remainder of the at least one layer is formed from latex.

23. The micro air vehicle of claim 12, wherein the ribs are generally parallel to each other.

24. The micro air vehicle of claim 12, wherein the ribs are formed of carbon fiber.

* * * * *